United States Patent

[11] 3,627,226

[72] Inventor Ralph E. Setter
Oklahoma City, Okla.
[21] Appl. No. 12,590
[22] Filed Feb. 19, 1970
[45] Patented Dec. 14, 1971
[73] Assignee Honeywell Information Systems Inc.

[54] SYSTEM FOR AUTOMATIC THREADING OF AN ELONGATED FLEXIBLE MEDIA
16 Claims, 6 Drawing Figs.

[52] U.S. Cl. .......... 242/185
[51] Int. Cl. .......... G11b 15/58, G11b 15/66
[50] Field of Search .......... 242/182, 183, 184, 185, 195; 226/118, 95, 97, 91, 92

[56] References Cited

UNITED STATES PATENTS

| | | | |
|---|---|---|---|
| 3,342,430 | 9/1967 | Murphy | 242/184 |
| 3,371,882 | 3/1968 | Orlando et al. | 242/209 |
| 3,393,878 | 7/1968 | Aweida et al. | 242/182 |

FOREIGN PATENTS

| | | | |
|---|---|---|---|
| 1,133,810 | 11/1956 | France | 242/182 |

*Primary Examiner*—George F. Mautz
*Attorneys*—Edward W. Hughes and Fred Jacob

ABSTRACT: An automatic tape- or film-threading system for use on a tape transport including means for directing a tape leader from a file reel onto a machine reel and into vacuum buffer bins. To accomplish the tape-controlling objectives, a novel fluid-operated system is controlled by sensing devices for determining tape position during threading operations.

INVENTOR.
RALPH E. SETTER
BY Herbert C. Haynes Jr.
AGENT

SYSTEM FOR AUTOMATIC THREADING OF AN ELONGATED FLEXIBLE MEDIA

BACKGROUND OF THE INVENTION

This invention relates to the handling of elongated flexible media and more particularly to an automatic tape- or film-threading system.

1. Field of the Invention

The handling of information-bearing media in the data-processing business has always been a problem, in that contaminants such as dust, moisture, operator handling, and the like, shorten the life of the media and often destroys or interferes with the recording and reproducing of information recorded on and read from the media. This problem has become more acute in recent years with the increase in density of the information being magnetically recorded on the media.

The storage and handling of magnetic tape is much more critical than, for example, the storage and handling of movie film, in that magnetic recording is accomplished on a thin film of ferromagnetic material deposited on the tape. If this thin film is disturbed, by chipping, embossing, crinkled edges and the like, the information magnetically recorded may be lost. The methods employed to move the tape and the speeds at which it is moved makes it imperative that the tape be kept clean and protected from physical damage.

Plastic canisters for storage of tapes have been used for dust-free storage of these tapes. Flange rings have also been provided to prevent the tape reel flanges from being deflected into contact with the edges of the tape. These rings are designed so that the tape may be wound and unwound from the reel without removing the ring.

The use of the hereinbefore-described canisters and flange rings have done much to eliminate tape damage. However, another area of possible contamination and damage exists when the operator manually threads the tape from the file reel to the machine reel. Although proper tape-handling techniques are continually being stressed, an inexperienced operator, or an experienced one in a hurry can ruin a tape by improper threading.

2. Description of the Prior Art

Heretofore the threading of magnetic tape in tape handler mechanisms has been accomplished by hand and includes, inter alia, the operator mounting the file reel on the tape handler and unwinding a sufficient amount of tape to permit it to be threaded through the read/write head and to the machine reel. The tape is then held on the hub of the machine reel by the operator until the machine reel is rotated by hand sufficiently to wind a given amount of tape on the reel at which time the operator removes his finger from the reel. The remainder of the operation is accomplished by the operator pushing the tape into the vacuum buffer bins.

Thus, the prior art method of threading tape involves many possibilities of tape contamination and damage. It would, therefore, be highly advantageous to provide an automatic threading system which would eliminate operator handling of magnetic tape.

SUMMARY OF THE INVENTION

In accordance with the invention claimed a new and useful mechanism is provided on a tape transport for automatically threading the tape mounted thereon. To accomplish this action a fluid-operated control system is employed to properly sequentially apply pressure and vacuum to a series of tape movement control devices. The fluid-operated control system performs its switching functions in response to strategically positioned sensors which provide signals indicative of tape position. The tape movement control devices include mechanisms which receive tape from the file reel and direct it to a transfer mechanism which carries it across the vacuum columns. The tape emerging from the transfer mechanism is attached to a vacuum hub of the machine reel and then sequentially fed into the machine reel and file reel vacuum columns. The tape-threading system is equipped to automatically adapt its operation so that, if desired, a flange ring tape protective device may be used on the file reel.

Accordingly, it is an object of this invention to provide an automatic system for threading an elongated flexible medium through a media-handling device.

Another object of this invention is to provide a system for automatically controlling movement of tape within a tape transport during threading operations.

A further object of this invention is to provide a series of devices which employ fluid pressure and vacuum to control tape movement through a tape transport during threading operations.

A further object of this invention is to provide a tape-handling system for use on a tape transport which automatically switches its operating procedure so that the system is operable with or without a flange ring tape protective device on the file reel.

A still further object of this invention is to provide a tape transfer device on a tape transport which receives tape from the file reel, carries it across the vacuum columns, and directs it toward the machine reel.

A still further object of this invention is to provide a novel hub device on the machine reel of a tape transport which attracts tape to the hub and retains it thereon by vacuum.

A still further object of this invention is to provide tape movement control devices for use on a tape transport which sequentially feed tape into the machine reel vacuum column and then into the file reel column.

A still further object of this invention is to provide an automatic tape-threading system for a tape transport, the threading system employing a fluid-operated switching system, which is controlled by strategically placed tape position sensors, to properly sequentially apply fluid pressures to a series of tape movement control devices.

The foregoing and other objects of this invention, the various features thereof, as well as the invention itself, may be more fully understood from the following description when read in conjunction with the accompanying drawings.

DESCRIPTION OF THE PREFERRED EMBODIMENT

Figure 1:
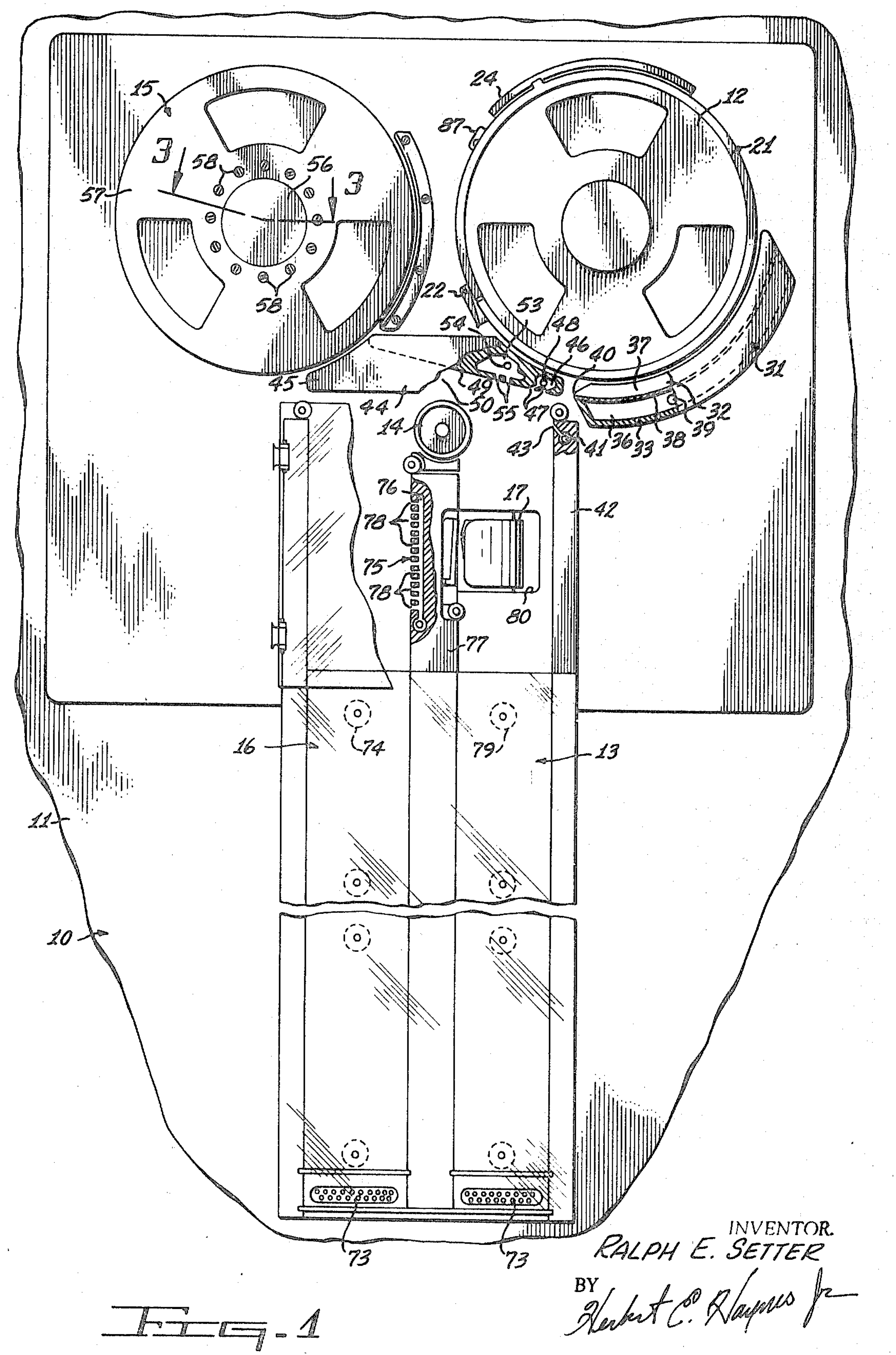
FIG. 1 is a fragmentary front view of a tape handler incorporating the features of the invention.
Figure 6:
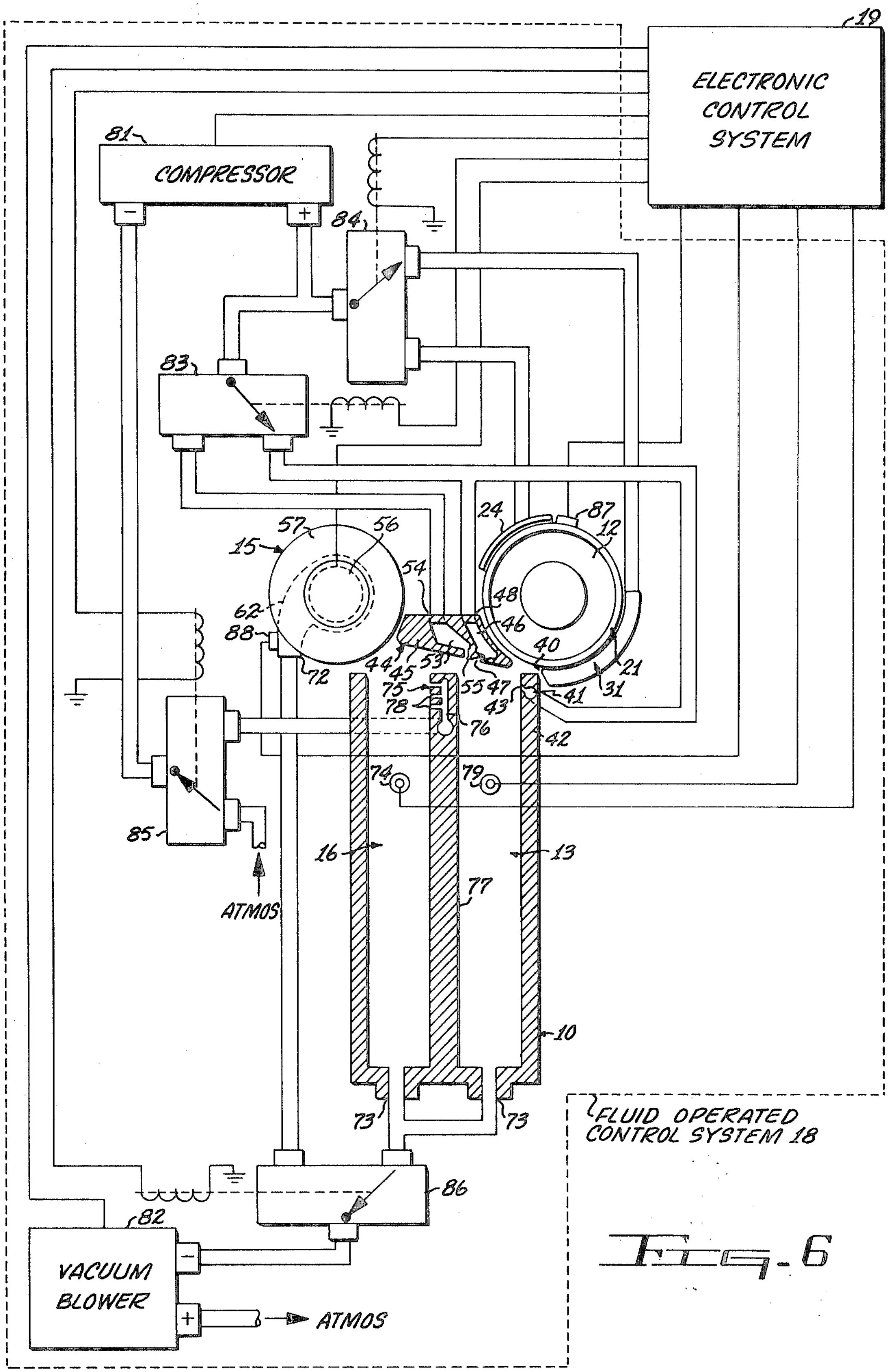
FIG. 6 is a schematic illustration showing the automatic threading system of the present invention.

Referring more particularly to the drawings, FIG. 1 is a fragmentary illustration of a tape handler 10, having the usual front panel 11, file reel 12, file reel vacuum column 13, capstan 14, machine reel 15, machine reel vacuum column 16, and a retractable read/write head 17. Some of these conventional elements have been modified and combined with a series of tape movement control devices. A novel fluid-operated control system 18 and electronic control circuitry 19, as schematically depicted in FIG. 6, provide the timing and switching functions to the system as will be hereinafter described in detail.

The fluid system 18, as described and claimed, is operable with many types of fluid media, for descriptive purposes, this embodiment will describe the system as being of the pneumatic type.

Figures 2, 3:
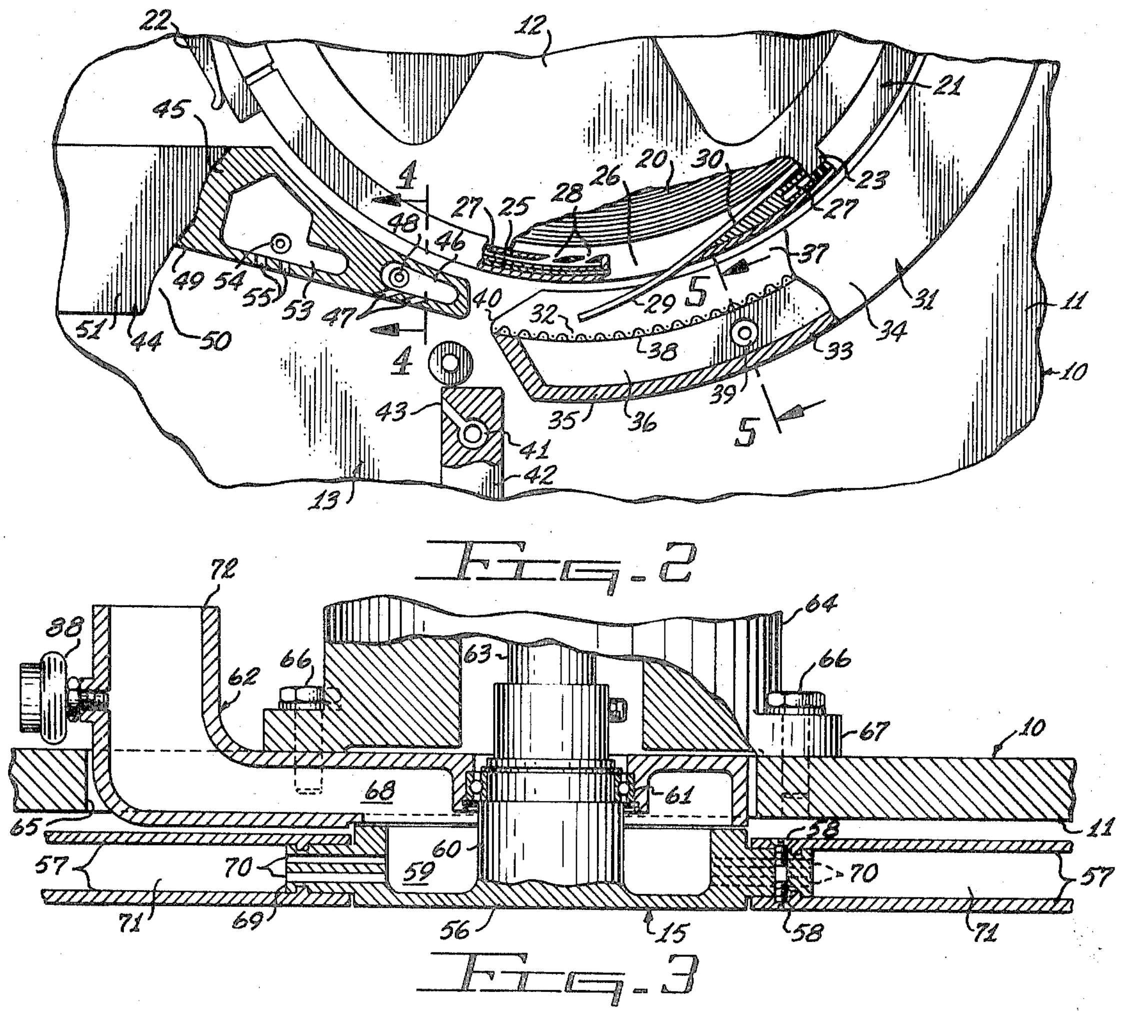
FIG. 2 is an enlarged fragmentary view of the tape handler illustrating some of the features of the invention.
FIG. 3 is a fragmentary sectional view taken on the line 3—3 of FIG. 1.

The file reel 12, having tape 20 wound thereon, is demountably rotatably attached to panel 11, and is driven by a servomotor (not shown) in the conventional manner. As shown in FIGS. 1 and 2, file reel 12, is provided with a well-known flange ring 21, for protecting tape from damage and contamination. Ring 21 is designed so that it remains with the tape reel when it is mounted on the handler. Tape handler 10, however, is capable of being operated with or without the ring 21, as the handler 10 is provided with means for accomplishing both modes of operation.

A typical flange ring is disclosed in U. S. Pat. No. 3,371,882. Ring 21 is provided with a clasp mechanism 22, which when closed, holds the ring 21 in contact with flanges 23 of reel 12 and is adapted when clasp 22 is released to spring out of contact with flanges 23, and into contact with appropriately positioned restraining shoe 24, transfer chamber means 44, and trough means 31 which hold the ring firmly in place and permit the reel 12 to be rotated relative thereto. Additional functions of the transfer chamber means 44 and the trough means 31 will hereinafter be described in detail. Suitable connected to clasp 22 is a slide member 25 which is closed when clasp 22 is latched, and when clasp 22 is released, slide 25 moves to open a window 26 through which the tape 20 is fed. Ring 21 is provided with a pressure chamber 27, which receives air pressure through suitable porting (not shown) in the front panel 11. Chamber 27 is provided with air jet apertures 28 adjacent to window 26 which directs air jets tangentially to the periphery of tape 20 and opposite to the direction of rotation thereof. This action will peel the free end or tape leader 29 from the periphery of the tape 20 and cause it to slide down a ramp 30 and out through window 26 toward the file reel vacuum column 13.

Figure 5:
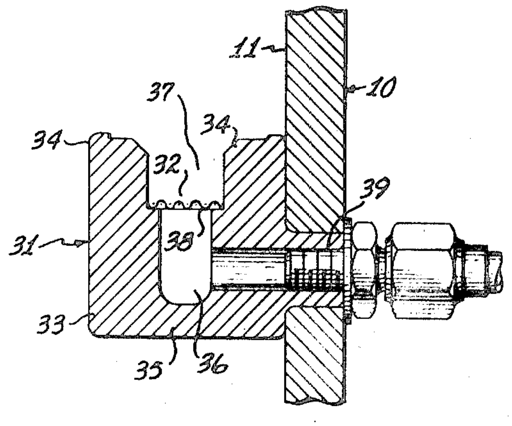
FIG. 5 is a fragmentary sectional view taken on the line 5—5 of FIG. 2.

Suitably mounted on panel 11 below file reel 12, and adjacent ring 21 is a trough means 31. Trough 31 has the hereinbefore-described function of a flange ring restraining shoe as well as an alternate function used when reel 12 is mounted without a flange ring 21. The alternate function provides an air-bearing surface 32 that directs the tape leader 29, under the action of gravity into the normal threading path. As best seen in FIGS. 2 and 5, trough 31 is provided with an arcuate housing 33 having a substantially U-shaped cross section with upstanding sidewalls 34 connected at the base by bottom 35. The lower portion of housing 33 forms a pressure chamber 36 and the upper portion forms a tape-guiding chute 37. A porous plate 38 is suitably mounted in housing 33 to provide a dividing partition between the pressure chamber 36 and the chute 37. The air-bearing surface 32 is created by air flowing from the pressure chamber 36 through the porous plate 38 and into chute 37. It has been found that a porous plate, either woven or fabricated by other manufacturing techniques, having porosity in the range of 15 to 25 microns, with 20 microns being ideal, properly disperses the pressure supplied to chamber 36, and thus creates the air-bearing surface needed to properly direct the tape leader 29 and prevent it from touching the plate 38. Pressure is supplied from the fluid control system 18 to chamber 36 through port 39 in the trough 31.

The threading sequence employed when a file reel is used which does not utilize a flange ring relies on gravity to direct tape leader 29, fed from rotating file reel 12, towards trough 31, where the air-bearing surface 32 directs leader 29 toward the output end 40 of trough 31, and toward file reel vacuum column 13.

To prevent the tape leader from falling into file reel vacuum column 13, a delivery pressure port means is provided which comprises a pressure chamber 41 formed in the right-hand spacer 42 of column 13. Chamber 41 has an angularly upwardly directed port 43 through which an air jet is directed to the underside of the tape.

A transfer chamber means 44, as well as providing retaining of ring 21, also provides for suspension of the tape as momentum supplied from rotation of the file reel 12 carries the tape across file reel vacuum column 13, capstan 14, and machine reel vacuum column 16. Transfer chamber 44 operates in accordance with Bernoulli's Principal, that is, a low-pressure pocket above the tape is produced so that the relatively high pressure below the tape provides the necessary buoyancy.

Figure 4:
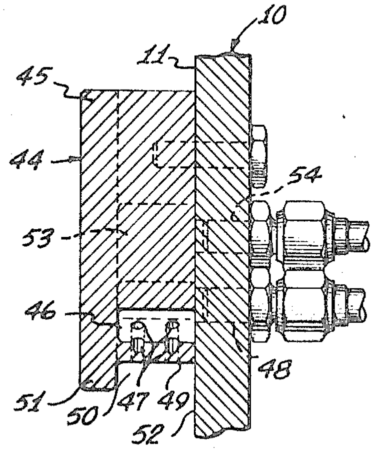
FIG. 4 is a fragmentary sectional view taken on the line 4—4 of FIG. 2.

Transfer chamber 44 comprises a housing 45 having a suspension pressure chamber 46 formed therein. Chamber 46 is open on one side and is enclosed when housing 45 is mounted on panel 11. The chamber 46 is provided with downwardly angularly disposed air passages or ports 47. Air pressure, supplied to chamber 46 through supply port 48, is angularly directed to the top surface of tape 20 by passages 47, causing a low-pressure area directly behind the area where the air jets impinge upon the tape. To prevent tape skew, air passages 47 exhaust through a roof 49 of an inverted U-shaped angularly upwardly disposed guideway 50. Guideway 50 is formed by an outwardly downwardly depending leg portion 51 formed integral with housing 45 and an inwardly disposed leg 52 being formed by a portion of panel 11, as best seen in FIG. 4. It has been found that an acute angle in the range of 5° to 40°, relative to roof 49 will provide a suitable low-pressure area. Due to manufacturing considerations, an angle of 30° was selected for this particular embodiment.

A blowdown pressure chamber 53 is also formed in housing 45. When air pressure is supplied to chamber 53 through port 54, downwardly directed air jets result as the air exhausts into the guideway 50 through a plurality of vertically disposed ports 55. The purpose of the blowdown chamber 53 is unrelated to the primary function of transfer chamber 44, and its operation will hereinafter be described in detail.

The angular disposition of guideway 50 of transfer chamber 44 is selected so that as tape 20 emerges from the guideway, it is directed toward a specially designed machine reel 15. As seen in FIG. 3, reel 15 comprises a center member or hub 56 to which flanges 57 are appropriately secured by screws 58. Hub 56 is provided with an annular chamber 59 and a hub shaft 60, which is coaxially rotatably mounted in a bearing 61 housed in a vacuum manifold means 62. Hub shaft 60 is coupled to a motor shaft 63 of a suitable drive motor 64. The entire assembly of reel 15, manifold 62, and motor 64 is retained within an opening 65 in panel 11 by bolts 66 securing motor flange 67 to panel 11. The manifold 62 is provided with an annular chamber 68 which is positioned adjacent to chamber 59 of hub 56. The peripheral surface 69 of hub 56 is provided with a plurality of radially disposed passages 70 communicating between chamber 59 and an area 71 between flanges 57. By applying a vacuum to manifold 62, through a port 72, air will flow from area 71 inwardly through passages 70, chambers 59 and 68 and out port 72. Therefore, air flow will draw tape leader 29 into area 71, and direct it toward the surface 69 of rotating machine reel 15 where it is retained by a vacuum from the fluid-operated control system 18.

After sufficient tape has been wound onto reel 15, such as two turns or more, the rotation of reel 15 is stopped and the vacuum is diverted from reel 15 to the vacuum inlet ports 73 of columns 13 and 16.

Vacuum columns 13 and 16 are conventional in operation, however, they have been modified to accommodate the automatic threading system of the present invention.

The machine reel vacuum column 16 is provided with a position sensor device 74 which is a pressure sensitive switch employed to detect the entry of tape 20 into the column 16 and provide a signal indicative thereof. A tape-brake means 75 is provided to temporarily stop tape movement with respect to column 16, to permit the tape to load into column 13. The tape-brake means 75 comprises an elongated chamber 76 formed in the center spacer 77, chamber 76 is provided with a series of vertically spaced horizontally disposed slots 78 communicating between chamber 76 and column 16. When vacuum from the fluid-operated control system 18 is applied to chamber 76, air flows inwardly through slots 78 and pulls the tape 20 into contact with the slots where it will be retained by the vacuum.

The file reel vacuum column 13 is provided with a position sensor device 79 which is similar to device 74 of column 16, and functions to provide a signal when tape 20 enters column 16. As seen in FIG. 1, column 13, is provided with read/write head 17 which is retractably mounted on the reverse side of panel 11. When it is in the extended position, head 17 protrudes through an opening 80 into column 13. The details of construction and operation of the head 17 are disclosed in U.S. Pat. application Ser. No. 783,255, filed Dec. 12, 1968, assigned to the same assignee as this application, now abandoned. Head 17 is retracted prior to commencing the automatic threading sequence of the present invention, and remains retracted until threading is completed.

With tape wound onto machine reel 15, the rotation of that reel stopped, and vacuum supplied to columns 13 and 16 as hereinbefore described, tape will continue to unwind from file reel 12 and will be drawn by vacuum into machine reel column 16. Tape will always be drawn into machine reel vacuum column 16 first due to the opening 80 in file reel column 13 into which read/write head 17 is retracted. The opening 80 provides a direct leak to atmosphere so that the vacuum in file reel column 13 is dissipated thus having no effect on the tape.

When the tape sensor 74, in column 16, detects the presence of tape 20 at its location, a signal is transmitted to the fluid-operated control system 18. Electric controls 19 combine to simultaneously; shut off air to the pressure chambers 41 and 46; apply vacuum to chamber 76; and apply air pressure to the blowdown chamber 53. This series of pressure and vacuum switching operations stops tape from entering column 16 and causes the tape to blow down into file reel column 13. The blowdown action continues until tape 20 passes below opening 80, at which time the tape provides an effective seal for the leak to atmosphere and the vacuum in column 13 pulls the tape into column 13.

The tape sensor 79 provided in column 13 senses the presence of tape 20 in column 13, and provides a signal to the electric circuitry 19 which controls the fluid-operated control system 18 to shut off vacuum to the elongated chamber 76, shuts off air to blowdown chamber 53, and provides a signal to trigger normal tape handler operation.

Pressure sensitive switches capable of performing the necessary sensing functions previously described are commercially available from a variety of sources, and generally comprise a bellows-type sensing element which expands and contracts in response to pressure changes. The expansion and contraction of the bellows assembly is used to open and close the contacts of the electrical switches.

OPERATING SEQUENCE

The operational sequence of the automatic threading system will now be described with particular reference to FIG. 6. To commence operation, the operator installs file reel 12, depresses appropriate switches (not shown) to actuate a compressor 81, a vacuum blower 82, and starts rotation of reels 12 and 15. Suitable control valves 83, 84, 85, and 86 are employed to properly route air under pressure and vacuum to the tape handler, and are schematically depicted in their normal or deenergized states.

A flange ring detector switch 87 is suitably mounted in panel 11, and is positioned to be actuated when the file reel 12, with a ring 21, is mounted on the handler 10. When this occurs, a signal is transmitted to circuitry 19 which actuates valve 84 to cause air under pressure from the positive pressure side of compressor 81 to flow through valve 84 to ring 21, to feed tape therefrom as hereinbefore described. If no signal is transmitted by detector switch 87, indicating that no ring 21 is being used, valve 84 remains in its deenergized position to route air to the trough 31. The deenergized position of valve 83 routes air to the delivery pressure chamber 41 and to suspension chamber 46. The negative pressure side of compressor 81 is connected to atmosphere by valve 85, when that valve is deenergized.

Valve 86 is connected to the negative pressure side of vacuum blower 82, and in its deenergized position generates a vacuum in columns 13–16. However, when the automatic threading sequence is started, the valve 86 is energized to pull a vacuum in the machine reel vacuum hub 56. A hub vacuum-sensing switch 88 is mounted in the manifold 62, and is designed to be actuated when tape 20 has wrapped around peripheral surface 69 of hub 56 a sufficient number of times to effectively seal off the radial passages 70. When this occurs, the vacuum in manifold 62 will substantially increase as the leak to atmosphere is sealed. Switch 88 is actuated by this change and generates a signal which is coupled to circuitry 19 to deenergize valve 86 and stop the rotation of machine reel 15.

After tape 20 has been wrapped onto machine reel 15 and valve 88 deenergized to provide a vacuum in columns 13 and 16, tape 20 is then drawn into column 16, as hereinbefore described. When the tape being drawn into column 16 drops below the high tape sensor 74, the sensor 74 then senses atmospheric pressure as the tape provides a seal between the vacuum source 82 and sensor 74. Sensor 74 transmits a signal to circuitry 19 which energizes valve 83 thus shutting off air to chambers 41 and 46 and routes the air to chamber 53. This same signal also energizes valve 85 to draw a vacuum in chamber 76 to stop tape from entering column 16. Tape 20 is then blown down into column 13, and when a high tape sensor 79 in that column is actuated, in a manner similar to the actuation of high tape sensor 74, a signal is generated which indicates that the threading sequence is complete, and normal tape-handling functions can commence.

The necessary electrical functions may be provided by suitable circuitry in the electronic control system 19.

While the principles of the invention have now been made clear in an illustrative embodiment, there will be immediately obvious to those skilled in the art many modifications of structure, arrangement, proportions, the elements, materials, and components, used in the practice of the invention, and otherwise, which are particularly adapted for specific environments and operating requirements without departing from those principles. The appended claims are therefore intended to cover and embrace any such modifications, within the limits only of the true spirit and scope of the invention.

What is claimed is:

1. A system for automatically threading a pliable medium from a first reel to a second reel comprising:

a. rotatably mounted first and second reels;

b. a fluid-bearing means mounted adjacent said first reel for directing the medium from said first reel toward said second reel;

c. transfer means arranged adjacent said fluid-bearing means for supplying an angularly directed jet of fluid under pressure to the top surface of the medium as it emerges from said fluid-bearing means to create a low-pressure pocket above the medium so that the relatively high pressure below the medium provides buoyancy thereto and directs the medium toward the hub of said second reel;

d. a vacuum chamber formed in the hub of said second reel, the hub having at least one passage communicating between said vacuum chamber and the periphery of the hub;

e. vacuum means arranged adjacent said second reel for applying a vacuum to the hub for drawing the end of the medium emerging from said transfer means into contact with the periphery of the hub and retaining it thereon;

f. means provided with said vacuum means for providing a first signal upon attachment of the medium to said second reel, said first signal being employed to stop rotation of said second reel;

g. at least one vacuum column mounted transversely of the path of longitudinal movement of the medium for receiving a part of the medium as it moves between said first and second reels;

h. means mounted adjacent said column for directing air under pressure against the medium for directing the medium into said column after the medium has been attached to the hub;

i. a medium-sensing means mounted in said column for producing a second signal when the medium has entered said column; and j. means mounted in said column for stopping entry of the medium therein in response to said second signal from said medium-sensing means.

2. A system for automatically threading a pliable tape from a first reel to a second reel comprising:

a. rotatably mounted first and second reels;

b. an air-trough-bearing means mounted adjacent said first reel for directing the tape from said first reel toward said second reel;

c. transfer means arranged adjacent said trough means for supplying an angularly directed jet of air under pressure to the top surface of the tape as it emerges from said trough means to create a low-pressure pocket above the tape so that the relatively high pressure below the tape provides buoyancy thereto and directs the tape toward the hub of said second reel;

d. a vacuum chamber formed in the hub of said second reel, the hub having at least one passage communicating between said vacuum chamber and the periphery of the hub;

e. vacuum means arranged adjacent said second reel for applying a vacuum to the hub for drawing the end of the tape emerging from said transfer means into contact with the periphery of the hub and retaining it thereon;

f. means for providing a first signal upon attachment of the tape to said second reel, said first signal being employed to stop rotation of said second reel;

g. at least one vacuum column mounted transversely of the path of longitudinal movement of the tape for receiving a part of the tape as it moves between said first and second reels;

h. means mounted adjacent said column for directing air under pressure against the tape for directing the tape into said column after said second reel has been stopped;

i. a tape-sensing means mounted in said column for producing a second signal when the tape has entered said column; and j. means mounted in said column for stopping entry of the tape therein in response to said second signal.

3. A system for use on a tape handler, the system being adapted to automatically thread the tape fed from a rotating file reel to a rotating machine reel and feed the tape into a machine reel vacuum column and a file reel vacuum column, the system comprising:

a. an air-bearing-trough means mounted adjacent the file reel for directing the tape toward the output end of said trough means;

b. a delivery pressure port means formed adjacent the output end of said trough means for supplying an air jet to the underside of the tape as it emerges from said trough means;

c. a transfer chamber means mounted adjacent the output end of said trough means and above both the machine and the file reel columns for providing buoyancy to the tape as it moves over the columns;

d. an annular vacuum chamber formed in the hub of the machine reel, the hub having a plurality of radial passages communicating between said vacuum chamber and the periphery of the hub;

e. a vacuum manifold means mounted adjacent the machine reel for applying a vacuum to said annular chamber whereby the tape emerging from said transfer chamber is drawn into contact with the periphery of the hub and retained thereon by the vacuum supplied thereto;

f. a vacuum-sensing means associated with said manifold means for transmitting a signal upon tape attachment to the machine reel, the signal being employed to stop rotation of the machine reel, so that the tape being fed from the file reel will be drawn by vacuum into the machine reel column;

g. a first tape-sensing means mounted in the machine reel column for transmitting a signal when the tape has entered that column;

h. a tape-brake means mounted in the machine reel column for stopping entry of the tape thereto in response to the signal from said first tape-sensing means;

i. blowdown pressure means mounted above the file reel column for providing a downwardly directed air jet in response to the signal from said first tape-sensing means, whereby the tape is blown into the file reel column;

j. a second tape-sensing means mounted in said file reel column for transmitting a signal indicative of the tape entering that column, the signal being employed to inactivate the automatic threading system and activate the tape handler; and k. a fluid-operated control means mounted in the tape handler for applying positive and negative pressure to the automatic threading system.

4. A system for automatically threading tape in a tape handler as claimed in claim 3 wherein said air-bearing trough comprises:

a. a housing;

b. a pressure chamber formed in the lower portion of said housing;

c. a chute formed in the upper portion of said housing; and d. a porous plate mounted in said housing between said pressure chamber and said chute.

5. A system for automatically threading tape as claimed in claim 4 wherein said porous plate has a porosity in the range of 15 to 25 microns.

6. A system for automatically threading tape in a tape handler as claimed in claim 3 wherein said transfer chamber means comprises;

a. a housing having a suspension pressure chamber formed therein and a guideway depending therefrom;

b. at least one angularly downwardly directed pressure passage communicating between the suspension chamber and the guideway; and c. a pressure port formed in said housing for directing pressure from said fluid-operated control system to said pressure chamber.

7. A system for automatically threading tape in a tape handler as claimed in claim 3 wherein said transfer chamber means comprises:

a. a housing having a chamber formed therein, said housing cooperating with the tape handler to enclose the chamber;

b. a guideway depending from said housing, said guideway defining an inverted U-shaped member having one leg and the roof portions formed integral with said housing, and the other leg formed by the tape handler;

c. a pressure port communicating with the enclosed chamber for fluid pressurization thereof; and d. at least one downwardly angularly disposed pressure passage formed in the roof of said guideway, said passage communicating between the enclosed chamber and said guideway.

8. A tape-feeding device as claimed in claim 7 wherein said downwardly angularly disposed pressure passage forms an acute angle with respect to the roof of said guideway, the acute angle being formed in the range of 5° to 40°.

9. A system for automatically threading tape in a tape handler as claimed in claim 3 wherein said manifold means comprises:

a. a housing fixedly mounted within an opening in the front panel of the tape handler;

b. bearing means formed in said housing for rotatably journaling the shaft of the machine reel;

c. motor means coupled to the shaft of the machine reel to provide rotary motion thereto;

d. an annular chamber formed in said housing and positioned to abut said annular chamber formed in the hub of the machine reel; and e. a port formed in said housing so that a vacuum may be applied to said manifold from said fluid-operated control system.

10. A system for automatically threading tape in a tape handler as claimed in claim 3 wherein said tape-brake means comprises:

a. an elongated chamber formed in the center spacer between the machine and file reel vacuum columns;

b. a plurality of vertically spaced horizontally disposed slots formed in the center spacer and positioned to communicate between the machine reel column and said elongated chamber; and c. a pressure port formed in the center spacer for applying vacuum from said fluid-operated control system to said elongated chamber.

11. A system for automatically threading tape in a tape handler as claimed in claim 3, wherein said blowdown pressure means comprises:

a. a blowdown pressure chamber formed in said transfer chamber means;

b. an inlet pressure port formed in said transfer chamber means for supplying pressure from said fluid-operated control system to said blowdown chamber; and c. at least one vertically disposed exhaust port formed in said transfer chamber means, said exhaust port communicating with said blowdown pressure chamber, whereby fluid pressure in said chamber results in a downwardly directed fluid jet.

12. A system for automatically threading tape in a tape handler as claimed in claim 3, wherein said fluid-operated control means comprises:

a. a compressor having a negative and a positive-pressure port;

b. a vacuum blower having a negative and a positive pressure port;

c. a first valve means connected to the positive port of said compressor and to said air-bearing-trough means for supplying pressure thereto;

d. a second valve means having an input port connected to the positive pressure port of said compressor, a first output port connected to said transfer chamber and to the delivery pressure port, said second valve means having a second output port connected to said blowdown pressure means, said second valve means adapted to switch pressure between the first and second output ports in response to the signal from said first tape-sensing means;

e. a third valve means connected to the negative pressure port of said compressor and to said tape-brake means for applying a vacuum thereto in response to the signal from said first tape-sensing means and removing the vacuum therefrom in response to the signal from said second tape-sensing means; and f. a fourth valve means having an inlet port connected to the negative pressure port of said vacuum blower, and a first output port connected to said vacuum manifold means, and a second output port connected to the machine and file reel vacuum columns, said fourth valve means adapted to switch the vacuum between said first and second output ports in response to the signal from said vacuum-sensing means.

13. A system for use on a tape handler, the system being adapted to automatically thread the tape from a rotating file reel equipped with a flange ring to a rotating machine reel and feed the tape into the machine reel and file reel vacuum columns, the system comprising:

a. a delivery pressure port means mounted adjacent the file reel for providing an upwardly angularly directed air jet to the underside of the tape as it emerges from the flange ring;

b. a transfer chamber means mounted above the machine reel and file reel vacuum columns and positioned to receive tape fed from the file reel, said transfer chamber means adapted to provide buoyancy to the tape as it moves over the machine reel and file reel vacuum columns;

c. an annular vacuum chamber formed in the hub of the machine reel, the hub having a plurality of radial passages communicating between said vacuum chamber and the periphery of the hub;

d. a vacuum manifold means mounted adjacent the machine reel for applying a vacuum to said annular chamber whereby the tape emerging from said transfer chamber is drawn into contact with the periphery of the hub and retained thereon by the vacuum supplied thereto;

e. vacuum-sensing means associated with said manifold means for providing a signal upon tape attachment to the machine reel, the signal being employed to stop rotation of the machine reel, so that the the tape being fed from the file reel will be drawn by vacuum into the machine reel column;

f. a first tape-sensing means mounted in the machine reel column for transmitting a signal when the tape has entered that column;

g. a tape-brake means mounted in the machine reel column for stopping entry of the tape thereinto in response to the signal from said first tape-sensing means;

h. blowdown pressure means mounted above the file reel column for providing a downwardly directed air jet in response to the signal from said first tape-sensing means, whereby the tape is blown into the file reel column;

i. a second tape-sensing means mounted in said file reel column for transmitting a signal indicative of the tape entering that column, the signal being employed to inactivate the automatic threading system and activate the tape handler; and j. a fluid-operated control means mounted in the tape handler for applying positive and negative pressure to the automatic threading system.

14. A system for automatically threading tape in a tape handler as claimed in claim 13, wherein said fluid-operated control means comprises:

a. a compressor having a negative and a positive pressure port;

b. a vacuum blower having a negative and a positive pressure port;

c. a first valve means connected to the positive port of said compressor and to the flange ring to supply fluid pressure thereto;

d. a second valve means having an input port connected to the positive pressure port of said compressor, a first output port connected to said transfer chamber and to the delivery pressure port, said second valve means having a second output port connected to said blowdown pressure means, said second valve means adapted to switch pressure between the first and second output ports in response to the signal from said first tape-sensing means;

e. a third valve means connected to the negative pressure port of said compressor and to said tape-brake means for applying a vacuum thereto in response to the signal from said first tape-sensing means and removing the vacuum therefrom in response to the signal from said second tape-sensing means; and f. a fourth valve means having an inlet port connected to the negative pressure port of said vacuum blower, and a first output port connected to said vacuum manifold means, and a second output port connected to the machine and file reel vacuum columns, said fourth valve means adapted to switch the vacuum between said first and second output ports in response to the signal from said vacuum-sensing means.

15. An automatic tape-threading system for use on a tape handler, the system being employed to direct the tape movement from a rotating file reel to a rotating machine reel and into machine reel and file reel vacuum columns, the system being adapted for use with a flange ring mounted on the file reel, the ring employing fluid pressure to feed the tape therefrom, the system further adapted for use in the absence of the flange ring, the system comprising:

a. a fluid-operated control means mounted in the tape handler for providing negative and positive pressures within the system;

b. a trough means mounted adjacent the file reel for providing an air-bearing surface to control movement of the tape emerging from the file reel, said trough means positioned to retain the ring when the ring is mounted on the file reel;

c. a flange ring detector switch mounted adjacent the file reel for transmitting a signal when the ring is mounted on the file reel, the signal being coupled to said fluid-operated control means to remove positive pressure from said trough and apply it to the ring;

d. a delivery pressure means mounted adjacent the file reel for supplying a jet of fluid to the underside of the tape being fed from the file reel;

e. a transfer chamber means mounted above the vacuum column for supplying at least one angularly directed jet of fluid to the top surface of the tape to create a low-pressure pocket above the tape so that relatively high pressure below the tape provides buoyancy thereto and directs the tape toward the machine reel;

f. a machine reel hub having an annular chamber formed therein with a plurality of radially disposed passages communicating between the annular chamber and the periphery of said hub;

g. a negative pressure manifold means mounted adjacent the machine reel for providing air flow from between the flange of the reel through the radial passages into the annular chamber of said hub and into said negative pressure manifold, whereby the tape emerging from said transfer chamber means is drawn into contact with the periphery of said hub and retained thereon by negative pressure;

h. vacuum-sensing means associated with said manifold means for transmitting a signal upon tape attachment to the machine reel, the signal being employed to stop rotation of the machine reel, so that the tape being fed from the file reel will be drawn by vacuum into the machine reel column;

i. a first tape-sensing means mounted in the machine reel column for transmitting a signal when the tape has entered that column;

j. a tape-brake means mounted in the machine reel column for stopping entry of the tape thereinto in response to the signal from said first tape-sensing means;

k. blowdown pressure means mounted above the file reel column for providing a downwardly directed air jet in response to the signal from said first tape-sensing means, whereby the tape is blown into the file reel column; and l. a second tape-sensing means mounted in said file reel column for transmitting a signal indicative of the tape entering that column, the signal being employed to inactivate the automatic threading system and activate the tape handler.

16. An automatic tape-threading system as claimed in claim 15, wherein said fluid-operated control means comprises:

a. a compressor having a negative and a positive pressure port;

b. a vacuum blower having a negative and a positive pressure port;

c. a first valve means having an inlet port connected to the positive port of said compressor, a first output port connected to said trough means, a second output port connected to the flange ring, said first valve means adapted to switch pressure between the first and second output ports in response to the signal provided by said flange ring detector switch;

d. a second valve means having an input port connected to the positive pressure port of said compressor, a first output port connected to said transfer chamber means and to the delivery pressure means, said second valve means having a second output port connected to said blowdown pressure means, said second valve means adapted to switch pressure between the first and second output ports in response to the signal from said first tape-sensing means;

e. a third valve means connected to the negative pressure port of said compressor and to said tape-brake means for applying a vacuum thereto in response to the signal from said first tape-sensing means and removing the vacuum therefrom in response to the signal from said second tape-sensing means; and f. a fourth valve means having an inlet port connected to the negative pressure port of said vacuum blower, and a first output port connected to said vacuum manifold means, and a second output port connected to the machine and file reel vacuum columns, said fourth valve means adapted to switch the vacuum between said first and second output ports in response to the signal from said vacuum-sensing means.

* * * * *